United States Patent
Yun et al.

(10) Patent No.: US 9,001,861 B2
(45) Date of Patent: Apr. 7, 2015

(54) DEVICE AND METHOD FOR PRODUCING COHERENT BI-COLOR LIGHT SOURCE

(71) Applicant: Wuhan Institute of Physics and Mathematics, Chinese Academy of Sciences, Wuhan (CN)

(72) Inventors: Enxue Yun, Wuhan (CN); Bozhong Tan, Wuhan (CN); Sihong Gu, Wuhan (CN)

(73) Assignee: Wuhan Institute of Physics and Mathematics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 14/459,289

(22) Filed: Aug. 13, 2014

(65) Prior Publication Data

US 2014/0355640 A1 Dec. 4, 2014

Related U.S. Application Data

(63) Continuation-in-part of application No. PCT/CN2012/078272, filed on Jul. 6, 2012.

(51) Int. Cl.
*H01S 3/08* (2006.01)
*H01S 3/106* (2006.01)
*H01S 3/10* (2006.01)

(52) U.S. Cl.
CPC ............. *H01S 3/106* (2013.01); *H01S 3/10061* (2013.01); *H01S 3/08059* (2013.01)

(58) Field of Classification Search
USPC .......................... 372/99, 105, 106, 98, 50.124
See application file for complete search history.

(56) References Cited

U.S. PATENT DOCUMENTS

| | | | |
|---|---|---|---|
| 2003/0007442 A1* | 1/2003 | Henrichs ........................ | 369/95 |
| 2009/0066952 A1* | 3/2009 | Wu et al. ....................... | 356/365 |
| 2013/0003763 A1* | 1/2013 | Myung et al. .................. | 372/25 |

* cited by examiner

*Primary Examiner* — Kinam Park
(74) *Attorney, Agent, or Firm* — Matthias Scholl P.C.; Matthias Scholl

(57) ABSTRACT

A device for producing a coherent bi-color light source, including: an array substrate, a first laser tube driven by a first direct current signal, a second laser tube driven by a modulation signal coupled by a microwave signal and a second DC signal, a half wave plate, a birefringent crystal, a first quarter wave plate, a partially reflecting plane mirror, and a second quarter wave plate. The first laser tube and the second laser tube are fixed on the array substrate. The half wave plate, the birefringent crystal, the first quarter wave plate, the partially reflecting plane mirror, and the second quarter wave plate are disposed in sequence in an emission direction of a laser beam emitted by the first laser tube. The second laser tube is disposed opposite to the birefringent crystal.

10 Claims, 5 Drawing Sheets

DEVICE AND METHOD FOR PRODUCING COHERENT BI-COLOR LIGHT SOURCE

CROSS-REFERENCE TO RELATED APPLICATIONS

This application is a continuation-in-part of International Patent Application No. PCT/CN2012/078272 with an international filing date of Jul. 6, 2012, designating the United States, now pending, and further claims priority benefits to Chinese Patent Application No. 201210082124.X filed Mar. 26, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to the field of passive coherent population trapping (CPT) atomic clock, and more particularly to a device and a method for producing a coherent bi-color light source.

2. Description of the Related Art

As an important part of a CPT atomic clock, the physical unit includes a light source, an atomic vapor cell, and a photo detector. A laser signal produced by the light source travels through the atomic vapor cell and acts on the atomic vapor therein to generate a CPT signal which is detected by the photo detector.

A typical light source includes a laser tube and a quarter wave plate. An input end of the laser tube is connected to a current driving circuit. When in use, a direct current output by the current driving circuit is coupled with a microwave signal to drive and regulates the laser tube to output a required laser signal. The laser signal passes through the quarter wave plate and outputs a left-handed or right-handed circularly polarized light. The left-handed or right-handed circularly polarized light acts on the atomic vapor in the atomic vapor cell, and the CPT signal is detected by the photo detector.

However, when the left-handed or right-handed circularly polarized light acts on the atomic vapor in the atomic vapor cell, the majority of atoms is populated at energy levels having the minimum or maximum magnetic quantum number because of the optical pumping effect while the population of atoms at two energy levels having the magnetic quantum number of zero (which is a necessity for the transition of the atomic clock) is small. In addition, the ±1 order frequency sideband in a frequency modulated (FM) multi-chromatic laser beam produced by the existing light source primarily participates in the CPT process and other useless frequency sidebands are background light so that a very low contrast of the obtained CPT signal results, thereby affecting the stability of the output frequency of the crystal oscillator.

SUMMARY OF THE INVENTION

In view of the above-described problems, it is one objective of the invention to provide a device and a method for producing a coherent bi-color light source to improve the quality of the CPT signal, thereby improving the stability of the output frequency of the CPT atomic clock. In addition, the device of the invention has a simple structure, low production costs, and small volume.

To achieve the above objective, in accordance with one embodiment of the invention, there is provided a device for producing a coherent bi-color light source, the device comprises: an array substrate, a first laser tube, a second laser tube, a half wave plate, a birefringent crystal, a first quarter wave plate, a partially reflecting plane mirror, and a second quarter wave plate. The first laser tube is driven by a first direct current (DC) signal. The second laser tube is driven by a modulation signal coupled by a microwave signal and a second DC signal. The first laser tube and the second laser tube are fixed on the array substrate. The half wave plate, the birefringent crystal, the first quarter wave plate, the partially reflecting plane mirror, and the second quarter wave plate are disposed in sequence in an emission direction of a laser beam emitted by the first laser tube. The second laser tube is disposed opposite to the birefringent crystal.

In a class of this embodiment, an included angle between an optical axis direction of the half wave plate and a polarization direction of the laser beam emitted by the first laser tube is 45°.

In a class of this embodiment, an included angle between an optical axis direction of the birefringent crystal and a surface of the birefringent crystal is 45°.

In a class of this embodiment, a thickness d of the birefringent crystal satisfies the formula:

$$d = L \times \left| \frac{n_o^2 + n_e^2}{n_o^2 - n_e^2} \right|,$$

in which, L represents a distance between a light center of the first laser tube and a light center of the second laser tube, $n_e$ and $n_o$ represent refractive indexes of an extraordinary light and ordinary light transmitted in the birefringent crystal, respectively.

In a class of this embodiment, the birefringent crystal is a neodymium yttrium vanadate crystal; and the first laser tube and the second laser tube are both vertical cavity surface emitting laser tubes.

In a class of this embodiment, an included angle between an optical axis direction of the first quarter wave plate and the polarization direction of the laser beam emitted by the first laser tube is 45°. An included angle between an optical axis direction of the second quarter wave plate and the polarization direction of the laser beam emitted by the first laser tube is 45°.

In a class of this embodiment, the laser beam emitted by the first laser tube that enters the partially reflecting plane mirror is perpendicular to a surface of the partially reflecting plane mirror.

In a class of this embodiment, the partially reflecting plane mirror has a ratio of transmittance to reflectivity of (93±3): (7∓3).

In accordance with another embodiment of the invention, there is provided a method for producing a coherent bi-color light source, the method comprising the following steps:

1) acquiring a horizontally linearly polarized monochromatic laser beam and a FM horizontally linearly polarized multi-chromatic laser beam;
2) converting the horizontally linearly polarized monochromatic laser beam into a vertically linearly polarized monochromatic laser beam, and combining the vertically linearly polarized monochromatic laser beam with the FM horizontally linearly polarized multi-chromatic laser beam;

3) converting the vertically linearly polarized monochromatic laser beam into a left-handed circularly polarized monochromatic laser beam, and converting the FM horizontally linearly polarized multi-chromatic laser beam into an FM right-handed circularly polarized multi-chromatic laser beam;

4) reflecting a part of the left-handed circularly polarized monochromatic laser beam, converting a reflected left-handed circularly polarized monochromatic laser beam into a horizontally linearly polarized monochromatic laser beam, and injecting the horizontally linearly polarized monochromatic laser beam into the FM horizontally linearly polarized multi-chromatic laser beam; meanwhile, reflecting a part of the FM right-handed circularly polarized multi-chromatic laser beam, converting a reflected FM right-handed circularly polarized multi-chromatic laser beam into a FM horizontally linearly polarized multi-chromatic laser beam, and injecting the FM horizontally linearly polarized multi-chromatic laser beam into the horizontally linearly polarized monochromatic laser beam; and 5) converting a transmitted left-handed circularly polarized monochromatic laser beam and a transmitted FM right-handed circularly polarized multi-chromatic laser beam obtained from inter-injection-locking into a vertically linearly polarized monochromatic laser beam and a FM horizontally linearly polarized multi-chromatic laser beam, respectively, and obtaining a coherent bi-color laser beam having inter-perpendicular polarization directions.

In a class of this embodiment, a ratio of the transmitted left-handed circularly polarized monochromatic laser beam to the reflected left-handed circularly polarized monochromatic laser beam is (93±3):(7∓3). A ratio of the transmitted FM right-handed circularly polarized multi-chromatic laser beam to the reflected FM right-handed circularly polarized multi-chromatic laser beam is (93±3):(7∓3).

Advantages according to embodiments of the invention are summarized as follows. The linear polarization directions of the obtained light source are perpendicular to each other and the linearly polarized light can be divided into a superposition of a right-handed circularly polarized light and a left-handed circularly polarized light. Optical pumping effects produced by the left-handed circularly polarized light and the right-handed circularly polarized light counteract with each other. When the linearly polarized bi-color light having the two inter-perpendicular polarization directions acts on the atoms, a majority of the atoms are enabled to populate at energy levels having magnetic quantum number of zero, in another word, a majority of atoms are populated at a clock transition state required by the atomic clock, thereby obtaining a high qualified CPT signal.

In another respect, the two laser tubes of the invention are inter-injection-locked by the reflected lights from the partially reflective plane mirror, the light intensity of sidebands of the FM light that do not participate in the CPT process is largely decreased, thus, an approximate coherent bi-color light having high purity is obtained, the highly purified coherent bi-color light acts on the atomic vapor in the atomic vapor cell, thereby improving the quality of the CPT signal. In still another respect, two naked laser tubes are utilized in the light source device and the optical elements in the light source device are suitable for integration, thereby largely decreasing the production costs and realizing the miniaturization.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a device and a method for producing a bi-color light source are described below. It should be noted that the following examples are intended to describe and not to limit the invention.

Figure 1:
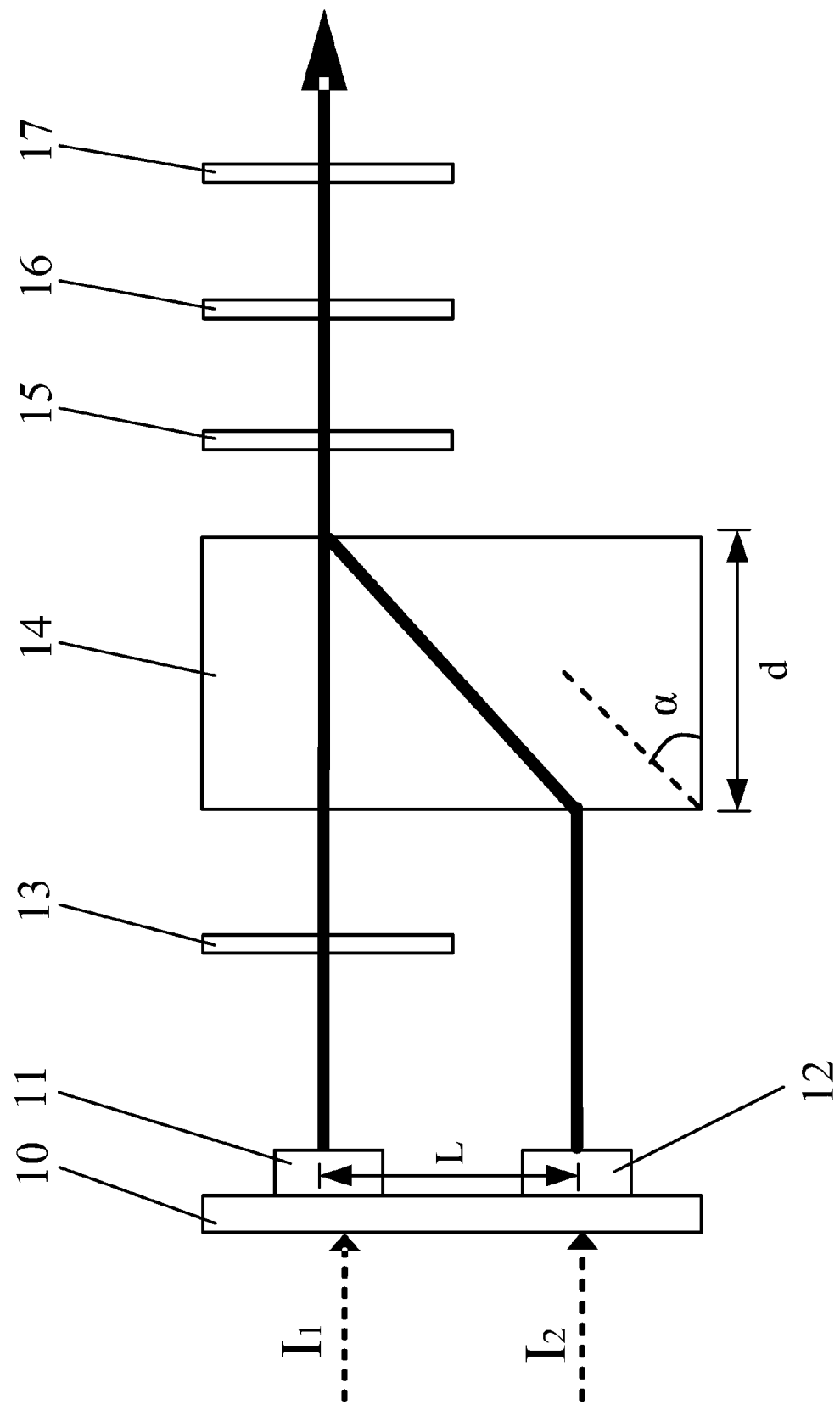
FIG. 1 is a structure diagram of a device for producing a coherent bi-color light source in accordance with one embodiment of the invention.

As shown in FIG. 1, a device for producing a bi-color light source comprises: an array substrate 10, a first laser tube 11 driven by a first DC signal I1, a second laser tube 12 driven by a modulation signal I2 coupled by a microwave signal and a second DC signal, a half wave plate 13, a birefringent crystal 14, a first quarter wave plate 15, a partially reflecting plane mirror 16, and a second quarter wave plate 17. The half wave plate 13, the birefringent crystal 14, the first quarter wave plate 15, the partially reflecting plane mirror 16, and the second quarter wave plate 17 are disposed in sequence in an emission direction of a laser beam emitted by the first laser tube 11. An upper end of the birefringent crystal 14 is disposed between the half wave plate 13 and the first quarter wave plate 15, and a lower end of the birefringent crystal 14 is disposed opposite to the second laser tube 12. Preferably, the first laser tube 11 and the second laser tube 12 are both vertical cavity surface emitting laser tubes; and the birefringent crystal 14 is a neodymium yttrium vanadate crystal.

Specifically, an included angle between an optical axis direction of the half wave plate 13 and a polarization direction of the laser beam emitted by the first laser tube 11 is 45°. An included angle α between an optical axis direction of the birefringent crystal 14 and a surface of the birefringent crystal is 45°. A thickness d of the birefringent crystal satisfies the formula:

$$d = L \times \left| \frac{n_o^2 + n_e^2}{n_o^2 - n_e^2} \right|,$$

in which, L represents a distance between a light center of the first laser tube 11 and a light center of the second laser tube 12, $n_e$ and $n_o$ represent refractive indexes of an extraordinary light and ordinary light transmitted in the birefringent crystal 14, respectively, which can be obtained in a technical manual. An included angle between an optical axis direction of the first quarter wave plate 15 and the polarization direction of the laser beam emitted by the first laser tube 11 is 45°. An included angle between an optical axis direction of the second quarter wave plate 17 and the polarization direction of the laser beam emitted by the first laser tube 11 is 45°. The laser beam emitted by the first laser tube 11 that enters the partially reflecting plane mirror 16 is perpendicular to a surface of the partially reflecting plane mirror 16. The partially reflecting plane mirror 16 has a ratio of transmittance to reflectivity of 93:7.

Figure 2:
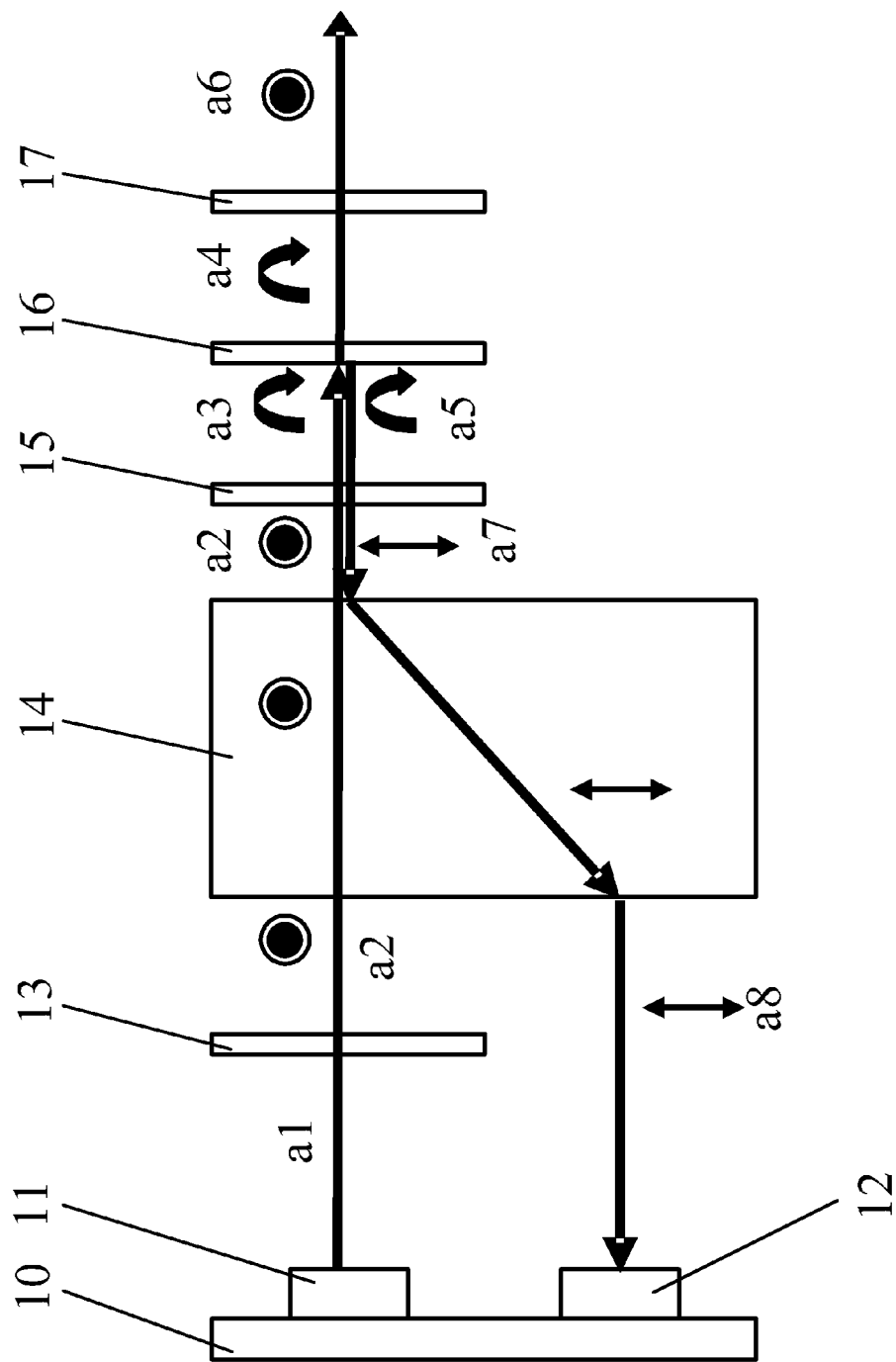
FIG. 2 is a schematic diagram showing an optical path and polarization variation of a laser beam output by a first laser tube in accordance with one embodiment of the invention.

FIG. 2 is a schematic diagram showing an optical path and polarization variation of the laser beam output by the first laser tube. As shown in FIG. 2, the first laser tube 11 is driven by the first DC signal I1 to emit a horizontally linearly polarized monochromatic laser beam a1. The half wave plate 13 is rotated to enable an included angle between the optical axis direction thereof and a horizontal direction to be 45°. The horizontally linearly polarized monochromatic laser beam a1 goes through the half wave plate 13 and is converted into a vertically linearly polarized monochromatic laser beam a2. When the vertically linearly polarized monochromatic laser beam a2 is transmitted through the birefringent crystal 14, a transmission direction thereof doesn't change, so that an emergent light from the birefringent crystal 14 is still the vertically linearly polarized monochromatic laser beam a2. The first quarter wave plate 15 is rotated to enable an included angle between the optical axis direction thereof and the horizontal direction to be 45°. The vertically linearly polarized monochromatic laser beam a2 goes through the first quarter wave plate 15 and is converted into a left-handed circularly polarized monochromatic laser beam a3. The left-handed circularly polarized monochromatic laser beam a3 is divided into a transmitted left-handed circularly polarized monochromatic laser beam a4 and a reflected left-handed circularly polarized monochromatic laser beam a5 by the partially reflecting plane mirror 16 having the ratio of transmittance to reflectivity of 93:7. The second quarter wave plate 17 is rotated to enable an included angle between the optical axis direction thereof and the horizontal direction to be 45°, the transmitted left-handed circularly polarized monochromatic laser beam a4 goes through the second quarter wave plate 17 and is re-converted into an output vertically linearly polarized monochromatic laser beam a6. The reflected left-handed circularly polarized monochromatic laser beam a5 goes through the first quarter wave plate 15 again and is converted into an injected horizontally linearly polarized monochromatic laser beam a7. Because of the birefringence feature of the birefringent crystal 14, a first refraction occurs when the injected horizontally linearly polarized monochromatic laser beam a7 enters the birefringent crystal 14, so that an included angle between a transmission direction of the injected horizontally linearly polarized monochromatic laser beam a7 in the birefringent crystal 14 and the horizontal direction is $$\cot^{-1}\left(\frac{n_e^2}{n_o^2}\right) - 45°.$$

A second refraction occurs when the injected horizontally linearly polarized monochromatic laser beam a7 is transmitted out of the birefringent crystal 14, so that the transmission direction of the injected horizontally linearly polarized monochromatic laser beam a7 transmitted out of the birefringent crystal 14 is changed back, and an injected horizontally linearly polarized laser beam a8 is obtained. The injected horizontally linearly polarized laser beam a8 which can be exactly injected into the second laser tube 12.

Figure 3:
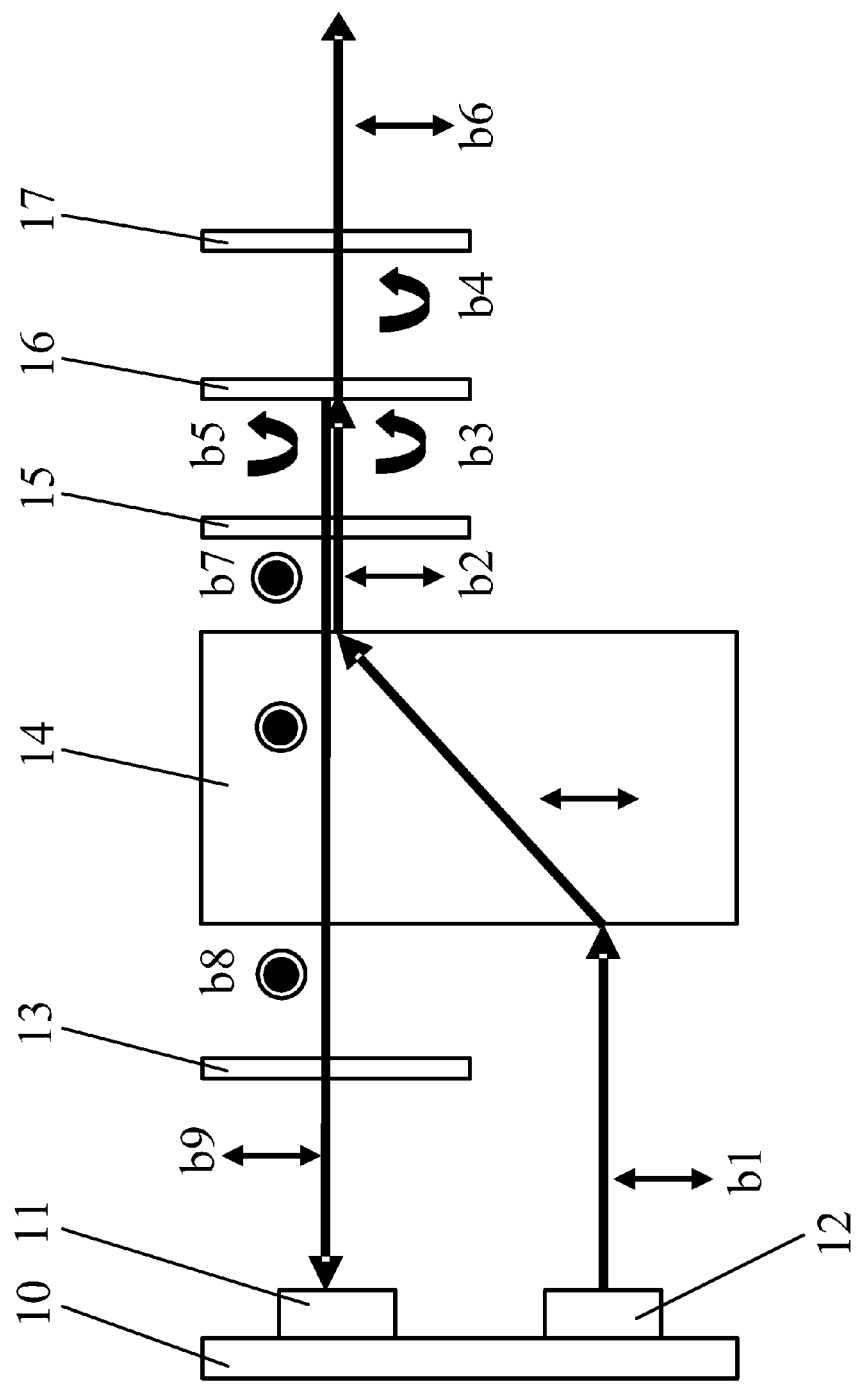
FIG. 3 is a schematic diagram showing an optical path and polarization variation of a laser beam output by a second laser tube in accordance with one embodiment of the invention.

FIG. 3 is a schematic diagram showing an optical path and polarization variation of a laser beam output by the second laser tube. As shown in FIG. 3, the second laser tube is driven by the modulation signal I2 coupled by the microwave signal and the second DC signal to emit a FM horizontally linearly polarized multi-chromatic laser beam b1. A first refraction of the FM horizontally linearly polarized multi-chromatic laser beam b1 occurs when it enters the birefringent crystal 14, so that an included angle between a transmission direction of the FM horizontally linearly polarized multi-chromatic laser beam b1 in the birefringent crystal 14 and the horizontal direction is $$\cot^{-1}\left(\frac{n_e^2}{n_o^2}\right) - 45°.$$

A second refraction of the FM horizontally linearly polarized multi-chromatic laser beam b1 when the FM horizontally linearly polarized multi-chromatic laser beam b1 is transmitted out of the birefringent crystal 14, so that a transmission direction of a new FM horizontally linearly polarized multi-chromatic laser beam b2 transmitted out of the birefringent crystal 14 is changed back again to the horizontal direction. The new FM horizontally linearly polarized multi-chromatic laser beam b2 goes through the first quarter wave plate 15 and is converted into a FM right-handed circularly polarized multi-chromatic laser beam b3. The FM right-handed circularly polarized multi-chromatic laser beam b3 is divided into a transmitted FM right-handed circularly polarized multi-chromatic laser beam b4 and a reflected FM right-handed circularly polarized multi-chromatic laser beam b5 by the partially reflecting plane mirror 16 having the ratio of transmittance to reflectivity of 93:7. The transmitted FM right-handed circularly polarized multi-chromatic laser beam b4 goes through the second quarter wave plate 17 and is re-converted into an output FM horizontally linearly polarized multi-chromatic laser beam b6. The reflected FM multi-chromatic right-handed circularly polarized laser beam b5 goes through the first quarter wave plate 13 again and is converted into an injected FM vertically linearly polarized multi-chromatic laser beam b7. The transmission direction of the injected FM vertically linearly polarized multi-chromatic laser beam b7 doesn't change and returns along with the original optical path. The injected FM vertically linearly polarized multi-chromatic laser beam b7 is transmitted through the birefringent crystal 14 and is converted into an injected vertically linearly polarized laser beam b8. The injected vertically linearly polarized laser beam b8 goes through the half wave plate 13 and is converted into an injected horizontally linearly polarized laser beam b9 which is injected into the first laser tube 11.

As illustrated in the above, the first laser tube 11 and the second laser tube 12 form inter-injection by the reflected lights from the partially reflecting plane mirror 16. A driving current of the second laser tube 12 is shallowly modulated by the microwave, the output laser contains a plurality of frequency sidebands at a certain interval, in which, a power of a carrier wave is 90% of a power of a total optical power of the light. The first DC signal I1 is regulated to enable a frequency of the laser output by the first laser tube 11 to overlap with a frequency of a +1 order sideband of the light of the second laser tube 12, so that the laser output by the first laser tube 11 and the +1 order sideband of the light of the second laser tube 12 form an in-difference locking; and the laser of the first laser tube 11 and the carrier wave of the second laser tube 12 form an out-of-difference locking with a frequency difference equal to the microwave frequency. The output lights transmitted out of the partially reflecting plane mirror 16 include carrier waves of the first laser tube 11 and the second laser tube 12, so that the coherent bi-color light having the inter-perpendicular polarization directions and relatively high purity is obtained.

Figure 4:
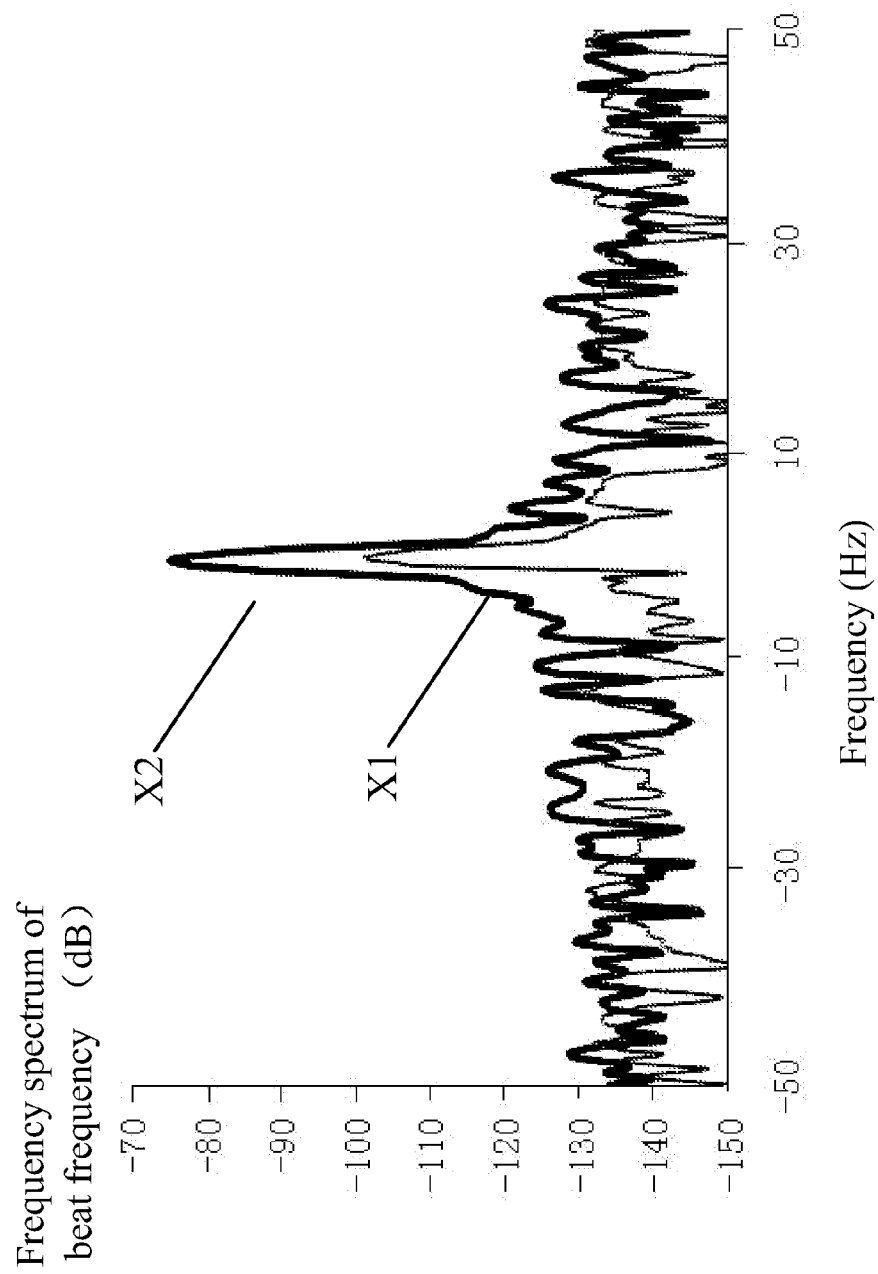
FIG. 4 is an oscillogram showing a beat frequency signal of a coherent bi-color light produced by a device for producing a coherent bi-color light source and a beat frequency signal of a multi-sideband light produced by a single laser tube driven by a modulation signal.
Figure 5:
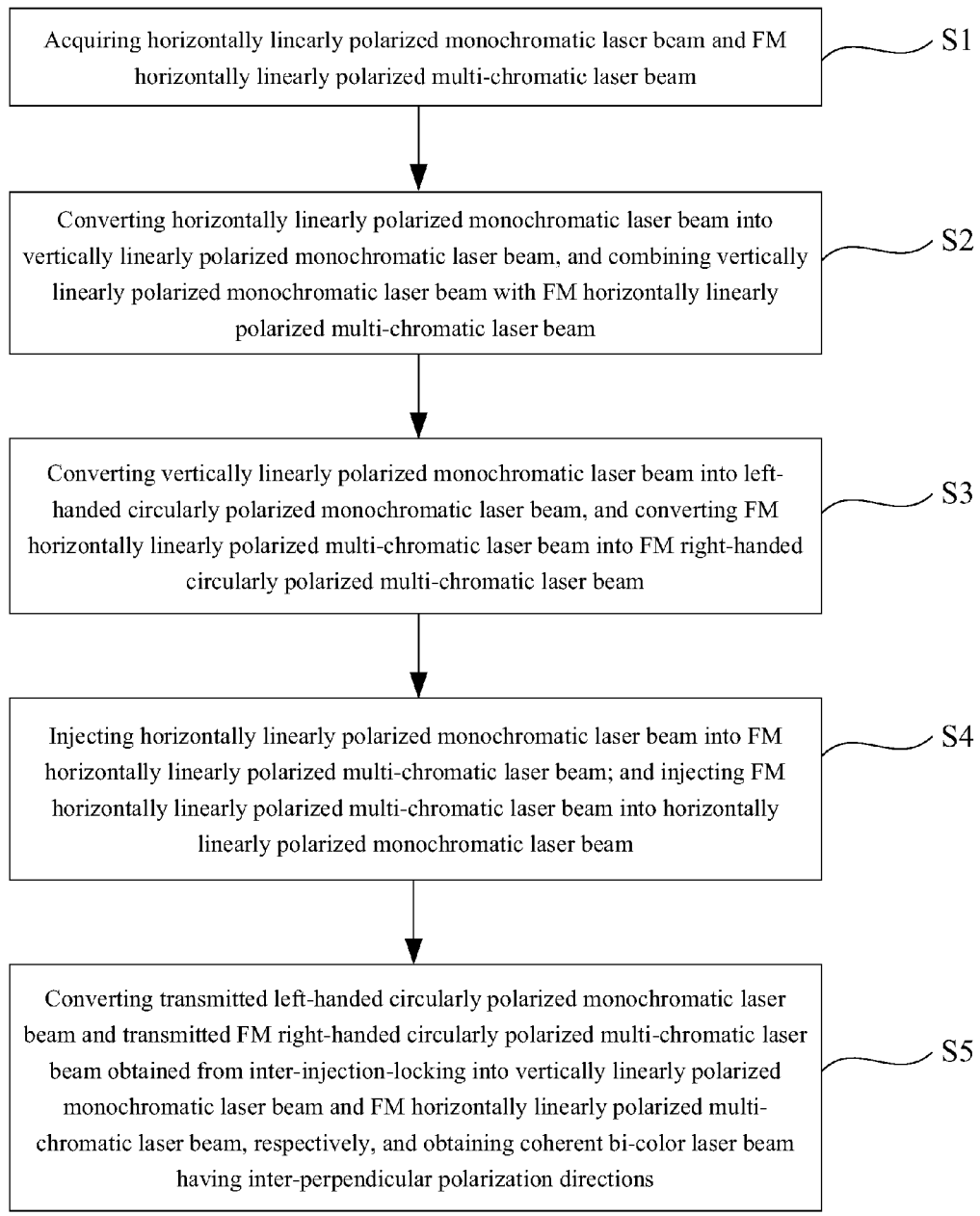
FIG. 5 is a flow chart of a method for producing a coherent bi-color light.

In order to judge the coherence of the obtained bi-color light, the output light is enabled to pass through a polarizer, the polarizer is rotated to enable a power ratio of the laser of the first laser tube 11 after transmitted out of the polarizer to the laser of the second laser tube 12 after transmitted out of the polarizer of 15:1. A high-speed photo detector is utilized to send a beat frequency signal of the bi-color light to a spectrometer for observation. As shown in FIG. 4, X1 is a beat frequency signal between sidebands of a multi-color sent out by the second laser tube 12, X2 is a beat frequency signal of combined laser beams sent out by the first laser tube 11 and the second laser tube 12 after being locked, it is found that a signal-to-noise ratio of X2 is higher than that of X1 by approximately 30 dB, which demonstrates that the device of the invention is exactly obtains highly purified and highly coherent bi-color beams. FIG. 5 is a flow chart of a method for producing a coherent bi-color light. The method for producing the coherent bi-color light comprises the following steps:

1) acquiring a horizontally linearly polarized monochromatic laser beam and a FM horizontally linearly polarized multi-chromatic laser beam;

2) converting the horizontally linearly polarized monochromatic laser beam into a vertically linearly polarized monochromatic laser beam, and combining the vertically linearly polarized monochromatic laser beam with the FM horizontally linearly polarized multi-chromatic laser beam;

3) converting the vertically linearly polarized monochromatic laser beam into a left-handed circularly polarized monochromatic laser beam, and converting the FM horizontally linearly polarized multi-chromatic laser beam into an FM right-handed circularly polarized multi-chromatic laser beam;

4) reflecting a part of the left-handed circularly polarized monochromatic laser beam, converting a reflected left-handed circularly polarized monochromatic laser beam into a horizontally linearly polarized monochromatic laser beam, and injecting the horizontally linearly polarized monochromatic laser beam into the FM horizontally linearly polarized multi-chromatic laser beam; meanwhile, reflecting a part of the FM right-handed circularly polarized multi-chromatic laser beam, converting a reflected FM right-handed circularly polarized multi-chromatic laser beam into a FM horizontally linearly polarized multi-chromatic laser beam, and injecting the FM horizontally linearly polarized multi-chromatic laser beam into the horizontally linearly polarized monochromatic laser beam; and 5) converting a transmitted left-handed circularly polarized monochromatic laser beam and a transmitted FM right-handed circularly polarized multi-chromatic laser beam obtained from inter-injection-locking into a vertically linearly polarized monochromatic laser beam and a FM horizontally linearly polarized multi-chromatic laser beam, respectively, and obtaining a coherent bi-color laser beam having inter-perpendicular polarization directions.

Specifically, a ratio of the transmitted left-handed circularly polarized monochromatic laser beam to the reflected left-handed circularly polarized monochromatic laser beam is 93:7. A ratio of the transmitted FM right-handed circularly polarized multi-chromatic laser beam to the reflected FM right-handed circularly polarized multi-chromatic laser beam is 93:7. A power of the carrier wave of the FM horizontally linearly polarized multi-chromatic laser beam accounts for 90% of a total power of the FM horizontally linearly polarized multi-chromatic laser beam.

As illustrated in the above, the linear polarization directions of the obtained light source are perpendicular to each other and the linearly polarized light can be divided into a superposition of a right-handed circularly polarized light and a left-handed circularly polarized light. Optical pumping effects produced by the left-handed circularly polarized light and the right-handed circularly polarized light counteract with each other. When the linearly polarized bi-color light having the two inter-perpendicular polarization directions acts on the atoms, a majority of the atoms are enabled to populate at energy levels having magnetic quantum number of zero, in another word, a majority of atoms are populated at a clock transition state required by the atomic clock, thereby obtaining a high qualified CPT signal. In another respect, the two laser tubes of the invention are inter-injection-locked by the reflected lights from the partially reflective plane mirror, the light intensity of sidebands of the FM light that do not participate in the CPT process is largely decreased, thus, an approximate coherent bi-color light having high purity is obtained, the highly purified coherent bi-color light acts on the atomic vapor in the atomic vapor cell, thereby improving the quality of the CPT signal. In still another respect, two naked laser tubes are utilized in the light source device and the optical elements in the light source device are suitable for integration, thereby largely decreasing the production costs and realizing the miniaturization.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for producing a coherent bi-color light source, the device comprising: an array substrate, a first laser tube, a second laser tube, a half wave plate, a birefringent crystal, a first quarter wave plate, a partially reflecting plane mirror, and a second quarter wave plate;

wherein
the first laser tube is driven by a first direct current (DC) signal;
the second laser tube is driven by a modulation signal coupled by a microwave signal and a second DC signal;
the first laser tube and the second laser tube are fixed on the array substrate;
the half wave plate, the birefringent crystal, the first quarter wave plate, the partially reflecting plane mirror, and the second quarter wave plate are disposed in sequence in an emission direction of a laser beam emitted by the first laser tube; and
the second laser tube is disposed opposite to the birefringent crystal.

2. The device of claim 1, wherein an included angle between an optical axis direction of the half wave plate and a polarization direction of the laser beam emitted by the first laser tube is 45°.

3. The device of claim 1, wherein an included angle between an optical axis direction of the birefringent crystal and a surface of the birefringent crystal is 45°.

4. The device of claim 3, wherein a thickness d of the birefringent crystal satisfies:

$$d = L \times \left| \frac{n_o^2 + n_e^2}{n_o^2 - n_e^2} \right|,$$

in which, L represents a distance between a light center of the first laser tube and a light center of the second laser tube, $n_e$ and $n_o$ represent refractive indexes of an extraordinary light and ordinary light transmitted in the birefringent crystal, respectively.

5. The device of claim 1, wherein the birefringent crystal is a neodymium yttrium vanadate crystal; and the first laser tube and the second laser tube are both vertical cavity surface emitting laser tubes.

6. The device of claim 1, wherein
an included angle between an optical axis direction of the first quarter wave plate and the polarization direction of the laser beam emitted by the first laser tube is 45°; and
an included angle between an optical axis direction of the second quarter wave plate and the polarization direction of the laser beam emitted by the first laser tube is 45°.

7. The device of claim 1, wherein the laser beam emitted by the first laser tube that enters the partially reflecting plane mirror is perpendicular to a surface of the partially reflecting plane mirror.

8. The device of claim 7, wherein the partially reflecting plane mirror has a ratio of transmittance to reflectivity of (93±3):(7∓3).

9. A method for producing a coherent bi-color light source, the method comprising:
1) acquiring a horizontally linearly polarized monochromatic laser beam and a frequency modulated (FM) horizontally linearly polarized multi-chromatic laser beam;
2) converting the horizontally linearly polarized monochromatic laser beam into a vertically linearly polarized monochromatic laser beam, and combining the vertically linearly polarized monochromatic laser beam with the FM horizontally linearly polarized multi-chromatic laser beam;
3) converting the vertically linearly polarized monochromatic laser beam into a left-handed circularly polarized monochromatic laser beam, and converting the FM horizontally linearly polarized multi-chromatic laser beam into an FM right-handed circularly polarized multi-chromatic laser beam;
4) reflecting a part of the left-handed circularly polarized monochromatic laser beam, converting a reflected left-handed circularly polarized monochromatic laser beam into a horizontally linearly polarized monochromatic laser beam, and injecting the horizontally linearly polarized monochromatic laser beam into the FM horizontally linearly polarized multi-chromatic laser beam; meanwhile, reflecting a part of the FM right-handed circularly polarized multi-chromatic laser beam, converting a reflected FM right-handed circularly polarized multi-chromatic laser beam into a FM horizontally linearly polarized multi-chromatic laser beam, and injecting the FM horizontally linearly polarized multi-chromatic laser beam into the horizontally linearly polarized monochromatic laser beam; and
5) converting a transmitted left-handed circularly polarized monochromatic laser beam and a transmitted FM right-handed circularly polarized multi-chromatic laser beam obtained from inter-injection-locking into a vertically linearly polarized monochromatic laser beam and a FM horizontally linearly polarized multi-chromatic laser beam, respectively, and obtaining a coherent bi-color laser beam that having inter-perpendicular polarization directions.

10. The method of claim 9, wherein
a ratio of the transmitted left-handed circularly polarized monochromatic laser beam to the reflected left-handed circularly polarized monochromatic laser beam is (93±3):(7∓3); and
a ratio of the transmitted FM right-handed circularly polarized multi-chromatic laser beam to the reflected FM right-handed circularly polarized multi-chromatic laser beam is (93±3):(7∓3).

* * * * *